Figure 1:
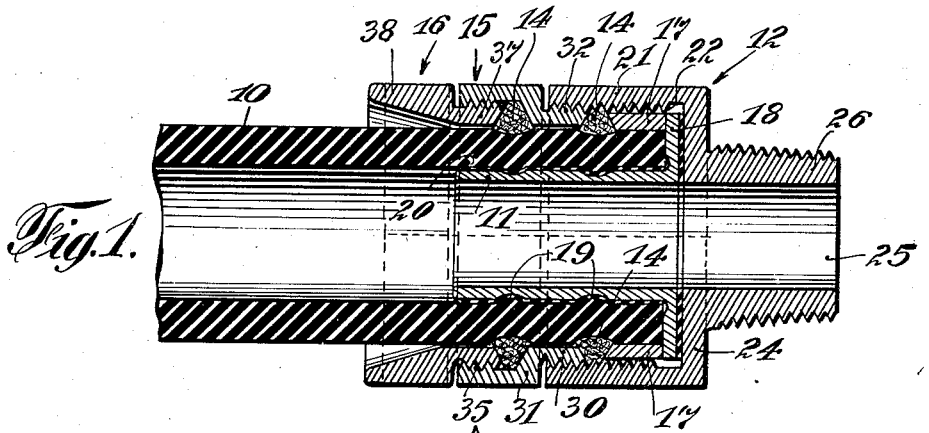

July 25, 1939.  W. G. WILSON  2,167,258

COUPLING

Filed Dec. 9, 1936

INVENTOR.
Wylie G. Wilson
BY Ramsey, Kent, Chisholm and Lutz
his ATTORNEYS

Patented July 25, 1939

2,167,258

UNITED STATES PATENT OFFICE 2,167,258

COUPLING

Wylie G. Wilson, Elizabeth, N. J., assignor to Everlasting Valve Company, Jersey City, N. J., a corporation of New Jersey Application December 9, 1936, Serial No. 114,884

5 Claims. (Cl. 285—86)

This invention relates to improvements in couplings and more particularly to improvements in couplings for yieldable tubes and the like having lacerable surfaces.

Heretofore, many difficulties have been experienced in providing and using couplings for yieldable tubes and particularly for hose, either of rubber or of other suitable composition. Not only does hose nominally of the same inside diameter and nominally of the same wall thickness vary in exterior diameter but in a piece of hose the exterior diameter varies somewhat at different points in its length. Accordingly it has frequently been necessary to provide different couplings of special fit to suit lengths of hose nominally of the same size and even to fit a different place on the same length of hose if for any reason it was desirable to cut that length. In other words, a standard coupling could not be supplied which could be relied upon to properly fit hose of a given nominal exterior diameter. Instead, the practice has been to provide a coupling for a particular hose and often it has been necessary to attach such a coupling to the hose at a factory. Couplings heretofore used have had characteristics which required careful skilled labor to insure the selection of a coupling which would properly fit the hose and connect that selected coupling to the hose in such a way that a satisfactory job would result. For this reason, if a hose should break in service the coupling could not be removed and readily attached to another piece of hose. Also, if a hose became worn adjacent the coupling and it was desirable to attach the coupling to the hose beyond the worn part, it has been customary to ship the entire hose to the factory for such repair. All of the foregoing involves considerable expense and frequently considerable delay, which may be of even more importance.

An object of the present invention is to provide a coupling which can be readily attached to and detached from the end of a hose.

Another object of the invention is to provide a coupling for yieldable hose having lacerable surfaces, which coupling utilizes packing material incapable of lacerating such hose.

Another object of the invention is to provide a coupling capable of being used with hose of various diameters within the range occurring in hose nominally of the same size (or exterior diameter).

A further object of the invention is to provide a coupling for the end of a hose, which coupling has a supporting member for the inner surface of the hose and which utilizes packing for firmly gripping the exterior surface of the hose, thereby compressing the hose against the interior support.

A still further object of the invention is to provide a coupling in which packing may be compressed at spaced intervals along the end of the hose.

A still further object of the invention is to provide a coupling of such character that the packing utilized therein can be varied in quantity according to the pressure to which the hose is subjected.

In carrying out the foregoing and other objects of the invention, the coupling in preferred form comprises a ferrule to be inserted in the end of a hose, such ferrule having an external flange. The end of the hose with the ferrule inserted therein is positioned in a stuffing box and packing is compressed around the exterior of the hose. If desired, the ferrule may have spaced circumferential grooves and provision may be made for applying the packing in such manner that when such packing is compressed it will be opposite said grooves. If the pressure to which the hose is to be subjected is relatively low, a single ring of packing may suffice. If higher pressure, however, may be encountered, multiple rings of packing may be used and in order that such may be accomplished, use is made of compression members which are in effect stuffing boxes. As an alternative, compression members may be inserted in the stuffing box to compress the packing, such compression members being in tandem relation with packing interposed therebetween. The various parts of the coupling fitting around the exterior of the hose are made of such internal diameter as to fit around a hose of a diameter within the normal variations found in hose of the same nominal size. While for simplicity the ferrule and stuffing box are made as separate parts, at the same time these parts may be integral or may be made in such fashion as to be permanently joined together.

Figure 2:
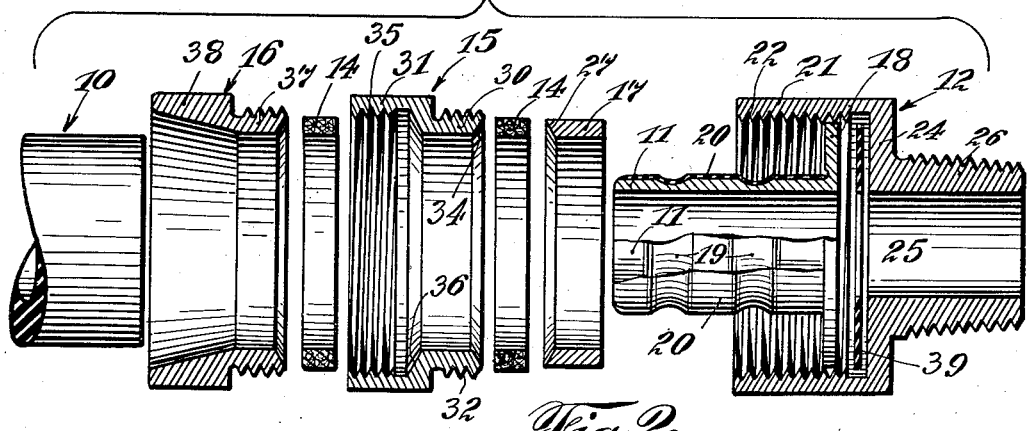
Figure 3:
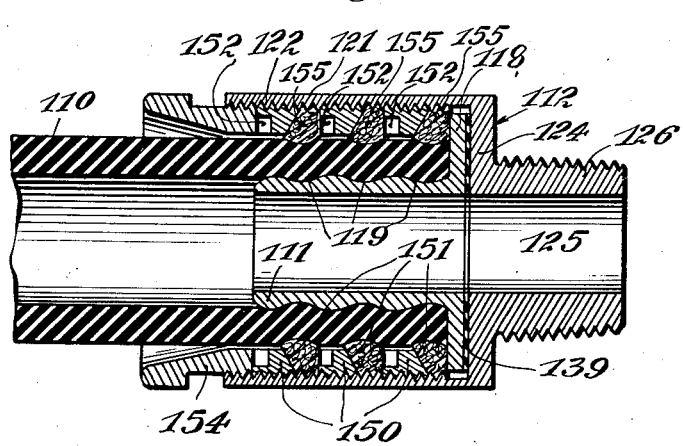

Other features, objects, and advantages of the invention will become apparent by reference to the following detail description of the accompanying drawing illustrating the same, wherein Fig. 1 is a section showing a coupling secured to an end of a section of hose;

Fig. 2 is a similar section showing the various parts of the coupling prior to assembly, and Fig. 3 is a view similar to Fig. 1 of a modified form of the invention.

Referring now to the drawing and particularly to Figs. 1 and 2, 10 indicates a section of hose to the end of which a coupling is to be secured. The hose 10 may be made of any yieldable material having lacerable surfaces, such as rubber, rubber-coated ply material, or any other material commonly found in commercial hose. The parts comprising a coupling are a ferrule 11, a stuffing box 12, packing material 14, an intermediate compression unit 15, and an end compression unit 16, as well as a spacer ring 17. The ferrule 10 is of tubular form and is provided with an external flange 18. This ferrule is made of some suitable metal. Preferably the periphery of the ferrule 10 is provided with spaced circumferential depressions or grooves 19. If desired, the exterior surface of the tubular part of this ferrule may have bonded thereto rubber as shown at 20, or any other suitable material. Such coating, however, is not necessary for efficient operation of the coupling. If the coating 20 is of rubber, ordinarily such rubber will be similar in kind to the interior surface of the hose 10, it being understood that the term "rubber" covers generally the various types of rubber which have different solvents.

The stuffing box 12 comprises a body portion 21 the outer surface of which is adapted to provide wrench-engaging surfaces and the interior of which is circular in cross-section and threaded as shown at 22. The body 21 has a floor part 24 having a central aperture 25 of substantially the same diameter as the internal diameter of ferrule 11. A neck part 26 is externally threaded and is formed as a continuation of the wall of aperture 25, for connection to another coupling part or to other devices to which the portion of hose is to be attached.

The ring 17 has an external diameter of such size as to permit the ring to be inserted into the stuffing box with the periphery thereof close to the apices of the threads 22. One end of ring 17 tapers inwardly as shown at 27. The purpose of this ring will be explained in detail later.

The packing 14 may be of any material of such character as to be incapable of lacterating the surface of a lacerable hose. For example, asbestos wool, twist, or string or any other soft type of packing will serve admirably. Preferably the packing is of a dry character. This packing 14 may be either of ring form as indicated generally in Fig. 2, or may be of rope form or of any other suitable form.

The compression member 15 comprises a ring part 30 and a body part 31. The ring part 30 has an internal diameter substantially equal to the internal diameter of ring 17, and has the exterior thereof threaded as at 32 to fit the threads 22. The end of the ring part 30 is tapered inwardly as shown at 34. The body part 31 has the interior thereof of circular cross-section and provided with threads 35 corresponding in all details to the threads 22. The exterior of the body part 31 is also shaped to provide wrench-engaging surfaces. The ring part 30 and the body part 31 are integral, and the wall joining these two parts is preferably tapered as indicated at 36.

The compression member 16 comprises a ring part 37 and a body part 38. The ring part 37 is similar to the ring part 30 of the member 15. The body part 38 has the exterior thereof shaped to provide wrench-engaging surfaces, while the inner portion thereof is tapered outwardly funnel fashion as shown.

In the use and operation of the coupling just described, the various parts of annular character are introduced around the end of a hose in reverse to the order of their application. As shown in Fig. 2, a member 16 is first moved along the hose, then a packing ring 14, if the packing be of ring form; next, a member 15, then a second packing ring 14, and finally the spacing ring 17. The ferrule 11 is then inserted in the end of the hose 10, and this same end of the hose with the ferrule attached is introduced into the stuffing box 12. If desired, a gasket 39 may be positioned between the flange 18 and the floor 12 of the stuffing box. With the parts in this position, the spacing ring 17 is moved downwardly into the stuffing box into the position shown in Fig. 1. The ring 17 is of such axial length as to substantially fill the space between the flange 18 and the edge of the first circumferential groove 19 in the ferrule 11. After the ring 17 has been positioned, packing is moved into the stuffing box in some suitable fashion. If the packing is of ring form and each portion 14 is composed of several rings each of which is a split ring, these rings are disposed with the joints thereof out of register with respect to each other. If the packing is of rope form or any other form, it may be wound around the hose and pushed into the stuffing box in the same manner as that followed in packing a piston rod or valve stem. Next, the member 15 is moved along the hose and rotated until threads 32 thereof engage threads 22 of the stuffing box. This member can then be rotated with the threads engaging until the packing 14 has been compressed to such an extent as to tightly grip the hose against the ferrule 11, and, if the ferrule 11 is grooved as shown, to force the material of the hose 10 into the first recess or groove 19 in the ferrule. When the approaching edges of the ring 17 and the member 15, (such edges being indicated at 17 and 34 respectively), are of tapered form, the packing when compressed will assume a shape of somewhat wedge character or a shape which may be called of sector-like form. The position of the end of the ring 17 assures that the packing will be compressed about the hose in proper register with the circumferential groove 19. The second packing material can then be moved into the body part 31 of the member 15, which body part forms in effect a second stuffing box. When the proper amount of packing has been pushed into this stuffing box, it may be compressed by manipulating the compression member 16 in the same manner as that described in connection with the member 15. Again the parts are so dimensioned that if a grooved ferrule as shown be used, the second ring of packing will be compressed in register with the second circumferential groove in the ferrule so that the hose is forced into this groove. The member 16 as before pointed out has a flaring or funnel-like end which is provided for reducing the probability of detrimental effects on the hose which might be due to or occasioned by sharp corners.

The ring 17 before described serves as a distance piece determining the lower limit of the packing material within the stuffing box. This ring is of such longitudinal length that the first quantity of packing when compressed will be in register with the first groove 19 on the ferrule 11. Thus the first ring of packing 14 is sufficiently removed from the end of the hose that there may be a relatively uncompressed section of hose (at the end) and then a highly compressed section. The relatively uncompressed end section resists such compression at the packing as would occur if the hose were pulled off the ferrule. If the spacing ring 17 were not used, then the grip of the first ring of packing would occur at the extreme end of the hose and would for all intents and purposes form largely merely a seal.

The arrangement shown in Figs. 1 and 2 and just described is particularly adapted for providing a coupling for a hose, which hose and coupling are to be subjected to relatively high pressures, for example, pressures about 100 lbs. per square inch, and up to 300 lbs. per square inch. If, however, the pressure to which he hose and coupling are to be subjected is relatively low of the order of say, not exceeding 100 lbs. per square inch, a single ring of packing 14 may be utilized. Under these conditions, the member 15 will be dispensed with and instead the member 16 will be threaded directly into the stuffing box 12 to compress the packing in register with the first groove 19 on the ferrule. If the pressure to which the hose and coupling are to be subjected is of greater value say, for example, of the order of 500 lbs. per square inch, a third ring of compressed packing may be used. Under these conditions of course, the tubular part of the ferrule would be of greater length and would be provided with three grooves 19 instead of two. Also, under these conditions, a second member 15 would be employed in tandem with the first member 15 and a final member 16 would likewise be employed.

If the material of the packing is of such nature that when compressed it forms a fluid-tight seal, the gasket 39 may be omitted. Under either arrangement, however, the coupling so provided is of such a character as to withstand pressure within the range for which the coupling has been designed and at the same time provide a fluid-tight joint. The stuffing box of course is designed to be attached to a tank or any other fitment. The packing so compressed forms rings which effectively lock the hose and the ferrule and lock the end of the hose in the stuffing box 12. Great force must be applied to pull the hose out of the coupling, and if that force be applied in the form of internal pressure of liquid or fluid, no leakage of liquid or fluid at the coupling will take place.

While the ferrule 11 has been illustrated and described as being separate from the stuffing box 13, it will be apparent of course that this ferrule could be made integral with the stuffing box or could be permanently fastened to the stuffing box with a liquid-tight joint prior to inserting the same in the end of a hose. The arrangement shown in Figs. 1 and 2 illustrates the use of the coupling in connection with a section of hose having a maximum external diameter for the specified size for which the coupling is furnished. If the hose is of such diameter as to leave a gap between the periphery thereof and the inner surface of ring 17, it may be advantageous to build up the end of the hose until it fits closely within this ring. For this purpose friction tape of conventional character may be applied around the end of the hose until the external diameter reaches the desired dimensions. When tape is so wrapped around the end of the hose, it adheres strongly to the exterior of the hose and to itself in its various layers, thereby forming a flange or enlarged diameter on the exterior end of the hose, which flange has several purposes. In addition to reenforcing the end of the hose, the flange formed by the tape constitutes a shoulder which must be sheared off through the packing or be sheared off the end of the hose before any mechanical pull or pressure thrust exerted upon the hose can cause separation of the hose from the coupling. Moreover, the added shoulder serves to prevent the packing material from becoming forced into a space between the end of the hose and the spacing ring 17 so that when the packing is compressed, the full contractive force thereof is applied against the periphery of the hose at an area in register with the groove in the ferrule. By following this practice it will be seen that a single dimensioned coupling will accommodate pieces of hose within the normal range of variation of external diameter, as before discussed.

It is possible, however, that the benefits obtained in the practice of applying an external shoulder to the hose in the manner before explained, may be of such importance that the practice will be desirable in all cases. In such instances the coupling parts will be made slightly oversize so that all hose within the normal variations may be wrapped in this manner. If desired, the entire end of the hose within a coupling proper can be so wrapped with adhesive tape which will, of course, provide the enlarged end to fit the spacing ring.

The result of such wrapping will be to produce an adhesive condition on the exterior of the hose end and produce a surface which will resist pulling past the gripping rings of packing. The exterior of the hose will be slightly stiffened by this adhesive tape and will always nicely fit the various rings of the coupling. Thus there will be no chance of even the softest packing being extruded past the hose with the consequence that the packing will remain at the precise point wherein it is desirable that it be located.

As will be apparent from the foregoing, the coupling can be readily installed on the end of a hose by even the most inexpert mechanic. Once installed the coupling is of durable character and has the advantage that should it become desirable to increase the compression on the packing at any time, such added compression can be obtained by merely screwing the various parts together more tightly. This coupling also has the advantage that it can be separated from the end of a hose with facility equalling that of attachment and thus if a part of the hose, practically invariably adjacent the end, becomes spoiled, the spoiled part, including the coupling, can be cut off, the coupling removed from the spoiled part and attached to a new end on the same piece of hose. Loss of time and the considerable expense attendant upon returning the hose to the factory for coupling installation is thereby eliminated.

A modification of the invention has been shown in Fig. 3. In this structure the stuffing box 112 is similar in all respects to the stuffing box 12 with the exception that the body part 121 is of greater axial length than the body part 21 of stuffing box 12. The remaining portions thereof are similar and comprise internal threads 122, a floor 124 and a neck 126 externally threaded; such neck being provided with a central aperture 125. Likewise, the ferrule 111 may be of slightly greater length than the ferrule 11 and is provided with circumferential grooves 119; in this case three in number. The ferrule is also provided with an external flange 118. The tubular part of the ferrule may have the outer surface thereof coated with rubber, as in Fig. 2, if desired, or such coating may be omitted. In this modification of the invention, use is made of a plurality of compression members 150, three of such members being shown in the drawing. Each member is in the form of a ring having one end edge thereof tapered as at 151. The opposite end edge of each ring is provided with apertures 152 for the reception of suitable portions of a wrench. A final locking member 154 in the nature of a ring, part of which is externally threaded, is also provided. Each of the rings 150 is externally threaded to engage the threads 122.

Packing 155 of a nature similar to the packing 14 is used in this form of the invention. In the assembling of this coupling the final ring 154 and rings 150 in the predetermined part are slipped over the end of the hose 110, and then the ferrule 111 is inserted in the end of the hose. This end of the hose may then be introduced into the stuffing box 112 with a gasket 139 in place, as shown, if the packing material is of a nature incapable of forming liquid or fluid-tight seal when compressed. With the end of the hose in the stuffing box a quantity of packing 155 is pushed into the space between the periphery of the hose and the wall of the stuffing box. The first ring 150 is then screwed down into the stuffing box to compress the packing. A suitable wrench-engaging opening 152 in the ring serves this purpose. After the first packing has been compressed, additional packing may be introduced above the first ring 150, and a second ring screwed into the stuffing box to compress this packing. This same procedure can then be followed out for the final quantity of packing, after which the locking ring 154 is screwed into place. It should be noted that the various separate parts of packing are disposed to coincide with the circumferential grooves 119 so that when the coupling has been completed the hose will be placed under contractive force at points in register with these grooves. In this manner the hose is effectively locked to the ferrule and the ferrule in turn is locked in the stuffing box with liquid and fluid-tight seals.

It is to be understood that the present invention is particularly useful in connection with tubes or hose which are not only yieldable as tubes (that is yieldable to shape deformation) but also which have walls yieldable per se. While the tube or hose described and illustrated herein is one composed of an internal rubber lining reenforced with wrappings of rubberized fabric and also having an external coating of rubber, it is to be understood that the invention is also adaptable for use on other types of hose or tubes such as those composed of straight cotton fabric or combination hose or flexible metallic hose which usually has a coating of rubber.

I claim:

1. A coupling for a tube having lacerable surfaces comprising a hollow support inserted in one end of said tube, an orificed stuffing box receiving the end of said tube with the inserted support, the end of said tube being larger in diameter than the orifice of said stuffing box, packing material in said stuffing box, said packing material being incapable of lacerating the surface of said tube, a compression member cooperating with said stuffing box for forcing said packing material into pressure contact with the outer surface of said tube against said support, said compression member having a part thereof forming a second stuffing box, similar packing material therein, and a second compression member acting on said last mentioned packing material.

2. A coupling for a tube having lacerable surfaces comprising a hollow support inserted in one end of said hose, said support having spaced circumferential grooves, an orificed stuffing box receiving the end of said tube with the inserted support, the end of said tube being larger in diameter than the orifice of said stuffing box, packing material in said stuffing box, said packing material being incapable of lacerating the surface of said tube, a compression member cooperating with said stuffing box for forcing said packing material into pressure contact with the outer surface of said tube in register with one of said circumferential grooves, said compression member having a part thereof forming a second stuffing box, similar packing material therein, and a second compression member forcing said second mentioned packing material into pressure contact with said tube in register with another of said grooves.

3. A coupling for a tube having lacerable surfaces comprising a hollow externally flanged support inserted in one end of said tube, said support having spaced circumferential grooves spaced from the end of said tube, an orificed stuffing box receiving the end of said tube with the inserted support, the end of said tube being larger in diameter than the orifice of said stuffing box, an annular spacing member in said stuffing box engaging the flange of said hollow support, packing material in said stuffing box adjacent said spacing member, said packing material being incapable of lacerating the surface of said tube, a compression member cooperating with said stuffing box and said spacing member for forcing said packing material into pressure contact with the surface of said tube in register with one of said circumferential grooves, said compression member having a part thereof forming a second stuffing box, similar packing material therein, and a second compression member forcing said second mentioned packing material into pressure contact with said tube in register with another of said grooves.

4. Means for joining a coupling to a hose, comprising a hollow nipple inserted in one end of the hose, means to frictionally resist separation of said hose and nipple, a sleeve carried by said coupling and enveloping the end of the hose, rings of relatively soft compressible packing material at spaced intervals along said hose, and compression means cooperating with said sleeve and one with another for selectively forcing said packing rings into pressure contact with the exterior of said hose.

5. Means for joining a coupling to a hose, comprising a hollow nipple inserted in one end of the hose, means to frictionally resist separation of said hose and nipple, a sleeve carried by said coupling and enveloping the end of the hose, rings of relatively soft compressible packing material at spaced intervals between said hose and said sleeve, and compression members alternately disposed relative to said packing rings and cooperating with said sleeve and one with another for selectively forcing said packing rings into pressure contact with the exterior of said hose.

WYLIE G. WILSON.